US006947987B2

(12) United States Patent
Boland

(10) Patent No.: US 6,947,987 B2
(45) Date of Patent: Sep. 20, 2005

(54) METHOD AND APPARATUS FOR ALLOCATING NETWORK RESOURCES AND CHANGING THE ALLOCATION BASED ON DYNAMIC WORKLOAD CHANGES

(75) Inventor: Vernon K. Boland, Lexington, SC (US)

(73) Assignee: NCR Corporation, Dayton, OH (US)

( * ) Notice: Subject to any disclaimer, the term of this patent is extended or adjusted under 35 U.S.C. 154(b) by 494 days.

(21) Appl. No.: 09/086,627

(22) Filed: May 29, 1998

(65) Prior Publication Data

US 2001/0003831 A1 Jun. 14, 2001

(51) Int. Cl.[7] .............................................. G06F 15/173
(52) U.S. Cl. ..................... 709/226; 709/229; 718/104
(58) Field of Search ................................ 709/104, 226, 709/103, 229; 718/104

(56) References Cited

U.S. PATENT DOCUMENTS

| 5,031,089 | A | * | 7/1991 | Liu et al. ..................... 709/226 |
| 5,093,912 | A | | 3/1992 | Dong et al. .................. 395/650 |
| 5,115,505 | A | | 5/1992 | Bishop et al. ............... 395/650 |
| 5,446,737 | A | * | 8/1995 | Cidon et al. ................ 370/85.5 |
| 5,467,343 | A | * | 11/1995 | Lee et al. ...................... 370/54 |
| 5,513,354 | A | | 4/1996 | Dwork et al. ............... 395/650 |
| 5,522,070 | A | | 5/1996 | Sumimoto .................... 395/650 |
| 5,524,247 | A | * | 6/1996 | Mizuno ........................ 710/200 |
| 5,634,072 | A | | 5/1997 | Allen et al. .................. 395/674 |
| 5,675,797 | A | | 10/1997 | Chung et al. ................ 395/674 |
| 5,682,601 | A | * | 10/1997 | Sasuta ......................... 455/33.2 |
| 5,826,082 | A | * | 10/1998 | Bishop et al. ............... 709/105 |
| 5,838,968 | A | * | 11/1998 | Culbert ........................ 709/105 |
| 5,889,956 | A | * | 3/1999 | Hauser et al. ............... 709/226 |
| 5,933,417 | A | * | 8/1999 | Rottoo ......................... 370/260 |
| 5,937,388 | A | * | 8/1999 | Davis et al. .................... 705/8 |
| 5,996,013 | A | * | 11/1999 | Delp et al. ................... 709/226 |
| 6,003,062 | A | * | 12/1999 | Greenberg et al. .......... 709/104 |
| 6,009,507 | A | * | 12/1999 | Brooks et al. ................. 712/28 |
| 6,088,732 | A | * | 7/2000 | Smith et al. ................. 709/229 |

FOREIGN PATENT DOCUMENTS

EP          413490 A3 *   8/1990   ........... H04Q/11/04

OTHER PUBLICATIONS

IBM Technical Disclosure Bulletin, Nov. 1995, Resource Allocation for Multimedia Support in a Non–Realtime Environment, vol. 38, Issue 11, pp. 279–280.*

* cited by examiner

Primary Examiner—Bradley Edelman
(74) Attorney, Agent, or Firm—Lowe Hauptman Gilman & Berner, LLP

(57) ABSTRACT

A method of allocating and distributing processes to network resources. The amount of network resources is determined for each process or groups of processes to be executed on the computer network. A minimum source allocation is provided for one or more of the processes. Each of the network resources is monitored for resource use. If necessary, a resource allocator redistributes network resources in accordance with the minimum resource allocation.

13 Claims, 4 Drawing Sheets

METHOD AND APPARATUS FOR ALLOCATING NETWORK RESOURCES AND CHANGING THE ALLOCATION BASED ON DYNAMIC WORKLOAD CHANGES

FIELD OF THE INVENTION

The present invention relates to a computer implemented method and apparatus for distributing computer resources on a network, and more particularly, to a method and apparatus for allocating network resources and for changing the allocation based on dynamic workload changes.

BACKGROUND OF THE INVENTION

It is desirable to distribute the processing load among multiple computers and processors in a computer network. The function of distributing the processing load among the multiple computers and processors in the network is often referred to as dynamic load balancing or processor assignment. Load balancing is frequently based on processor efficiency, reliability and usage.

An example of load balancing for one computer is disclosed in U.S. Pat. No. 5,675,797 where resources are initially allocated into buffer pools. To enhance system performance, buffer pool resources are reallocated based on a performance index. For example, the buffer pool with the largest performance index is allocated additional resources and the buffer pool with the smallest performance loses some of its resources.

Another way of load balancing or allocating system resources in a computer network is disclosed in U.S. Pat. No. 5,513,354 in which network processors exchange views as to which pending tasks have or have not been completed. The network processors reach a consensus as to the overall state of completion of the pending tasks and reallocate computer network resources based on the consensus reached.

Yet another method is disclosed in U.S. Pat. No. 5,522,070 in which a scheduler allocates computer resources on a network to a plurality of processes. Assuming that the amount of computer resources for processing each of the plurality of processes is known, and the amount of available resources on each computer in the network is known, the scheduler allots the process having the largest amount of processing to a computer having the largest amount of available resources. The scheduler then allots the process having the second largest amount of processing to a computer having the second largest amount of available resources and so forth. None of the foregoing patents ensure that a particular process will have the minimum required resources.

Although these allocating systems reallocate computer and/or network resources to achieve maximum efficiency and utilization of computers and processors, situations occur where a high priority process or group of processes require a minimum amount of network resources. For example, if one of the computers on a computer network fails, and a network server redistributes the processing load among the remaining network computers, this high priority process or group of processes may not have sufficient network resources allocated to either run on the network, or run efficiently. Meanwhile, a lower priority process may have network resources automatically reallocated thereto by known prior art allocating systems, which should more preferably be reallocated to the high priority process or group of processes. None of the allocating systems known to the inventors provide a minimum amount of network resources for a process or group of processes. Therefore, a need exists for a method and apparatus for allocating and switching network resources based on dynamic workload changes in which processes or groups of processes having high priority are allocated a minimum amount of required network resources.

SUMMARY OF THE INVENTION

It is an object of the present invention to provide a new and improved method and apparatus which sets a minimum resource allocation for a first process or group of processes running on a computer network.

It is a further object of the present invention to provide a new and improved method and apparatus for prioritizing the resources required on the computer network for two or more processes or group of processes such that the two processes or group of processes have at least the minimum resources allocated for the two or more processes or group of processes to run.

Yet another object of the present invention is to allocate computer resources to allocate a minimum amount of network resources to process or group of processes irrespective of the requirements of any other process or group of processes running on the computer network.

These and other objects of the present invention are achieved by a method for use on a computer network for allocating and distributing processes to network resources. The amount of network resources is determined for each processes or groups of processes to be executed on the computer network. A minimum resource allocation is provided for one or more of the processes. The minimum resource allocation means that the process having the highest priority will be allocated resources before other processes. Each of the network resources is monitored for resource use. If necessary, a resource allocator redistributes network resources in accordance with the minimum resource allocation.

The foregoing objects of the present invention are achieved by a method for use on a computer network which includes monitoring at least two nodes on the computer network among at least two processes for allocation of computer resources on each of the at least two nodes. For a first process of the at least two processes running on at least one of the two nodes, a minimum resource allocation is set for the first process on the at least two nodes irrespective of the computer resources needed by other processes and processes running on the computer network.

The foregoing objects of the present invention are also achieved by an article including at least one sequence of machine executable instructions in machine readable form wherein execution of the instructions by one or more processors causes the one or more processors to monitor at least two nodes on the computer network among at least two processes for allocation of the computer resources on each of the at least two nodes. The first process of the at least two processes running on at least one of the two nodes, a minimum resource allocation is set for the first process on the at least two nodes irrespective of the computer resources needed by other processes and processes running on the computer network.

The foregoing objects are also achieved by a computer architecture for switching resource allocation policies on a computer network including monitoring means for monitoring at least two nodes on the computer network among at least two processes for allocation of computer resources on each of the at least two nodes. For a first process of the at least two processes running on at least one of the two nodes, setting means are provided for setting a minimum resource allocation for the first process on the at least two nodes irrespective of the computer resources needed by other processes and processes running on the computer network.

The foregoing objects are also achieved by a computer system comprising a processor and a memory coupled to the processor with the memory having stored therein sequences of instructions, which, when executed by the processor, causes the processor to perform the steps of monitoring at least two nodes on the computer network among at least two processes for allocation of computer resources on each of the at least two nodes. For a first process of the at least two processes running on at least one of the two nodes, a minimum resource allocation is set for the first process on the at least two nodes irrespective of the computer resources needed by other processes and processes running on the computer network.

Still other objects and advantage of the present invention will become readily apparent to those skilled in the art from following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

BEST MODE FOR CARRYING OUT THE INVENTION

A method and apparatus for allocating network resources and changing the allocation based on dynamic workload changes according to the present invention are described. In the following description, for purposes of explanation, numerous specific details are set forth in order to provide a thorough understanding of the present invention. It will be apparent, however, that the present invention can be practiced without these specific details. In other instances, well-known structures and devices are shown in block diagram form in order to avoid unnecessarily obscuring the present invention.

Figure 1:
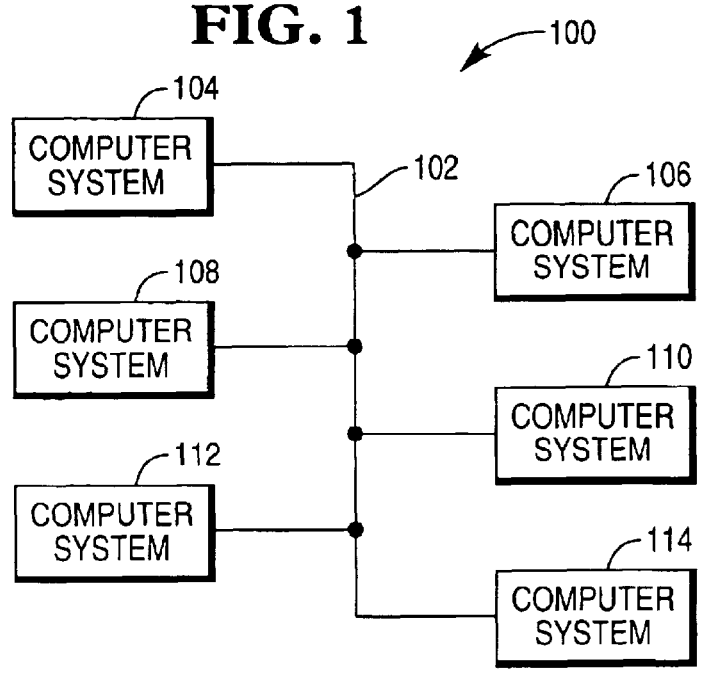
FIG. 1 is a high-level block diagram of an exemplary computer network on which the present invention can be implemented.

FIG. 1 is a block diagram of an exemplary computer network 100 including a plurality of computer systems serving as network devices 104, 106, 108, 110, 112 on which an embodiment of the invention can be used. The network devices 104, 106, 108, 110, 112 can be identical or different and can include devices such as hosts, servers and personal computers. The present invention is usable on such networks as ARCnet, Ethernets and Token-Ring networks, wireless networks, among other networks. The network 100, in this example, has a central network cable 102, also known as media, which can be of any known physical configuration including unshielded twisted pair (UTP) wire, coaxial cable, shielded twisted pair wire, fiber optic cable, and the like. Alternatively, the network devices could communicate across wireless links.

The network 100 includes a network server 106 coupled to the network cable 102 and a plurality of other computer systems 104, 108, 110, 112 each coupled to the network cable 102. Each computer system is also referred to herein as a node. A node can be any type of known network device having an address on the network 100. As can be appreciated, many other and additional devices can be coupled to the network including additional personal computers, mini-mainframes, mainframes and other devices not illustrated or described which are well known in the art.

Figure 2:
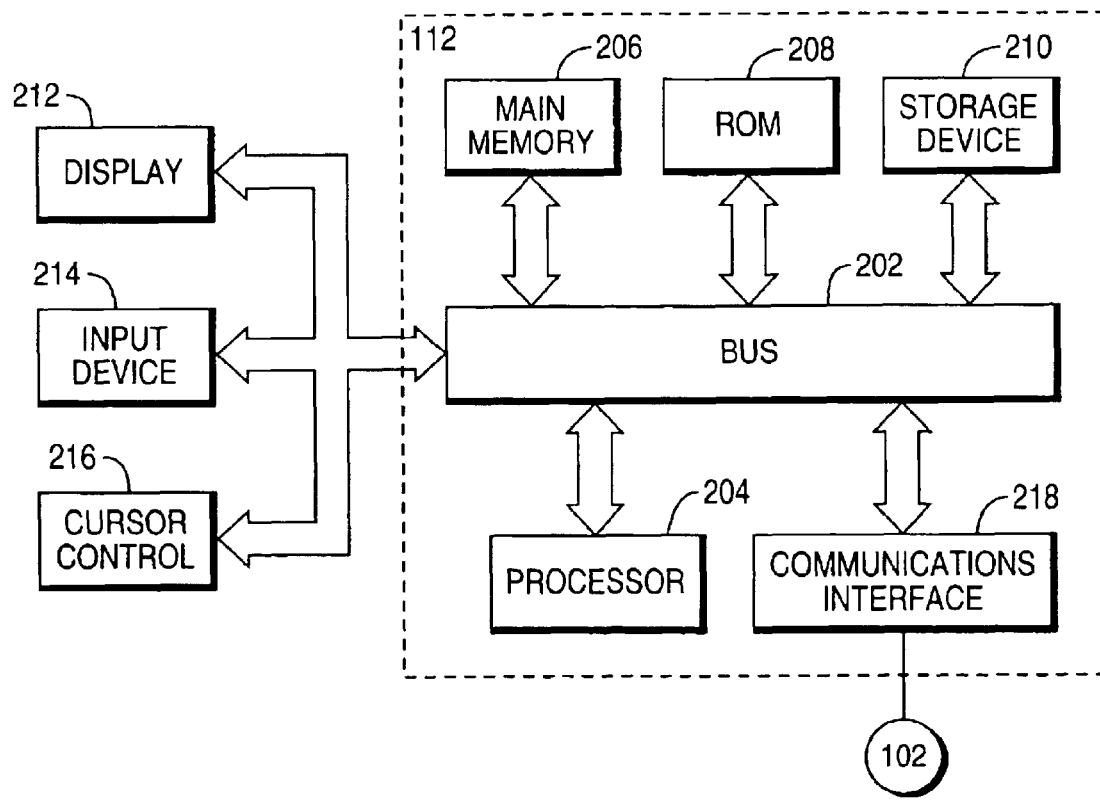
FIG. 2 is a high-level block diagram of an exemplary computer system with which the present invention can be implemented.

FIG. 2 is a block diagram illustrating an exemplary computer system, such as the computer system 112 depicted in FIG. 1, usable on the network 100. The present invention is usable with currently available personal computers, mini-mainframes, mainframes and the like. Although the computer system 112 is depicted in FIG. 1 as a network device which is part of a wired local network, the computer system 112 is also envisioned as being connected to the network 100 by a wireless link.

Computer system 112 includes a bus 202 or other communication mechanism for communicating information, and a processor 204 coupled with the bus 202 for processing information. Computer system 112 also includes a main memory 206, such as a random access memory (RAM) or other dynamic storage device, coupled to the bus 202 for storing information and instructions to be executed by processor 204. Main memory 206 also can be used for storing temporary variables or other intermediate information during execution of instructions to be executed by processor 204. Computer system 112 further includes a read only memory (ROM) 208 or other static storage device coupled to the bus 202 for storing static information and instructions for the processor 204. A storage device 210, such as a magnetic disk or optical disk, is provided and coupled to the bus 202 for storing information and instructions.

Computer system 112 can be coupled via the bus 202 to a display 212, such as a cathode ray tube (CRT) or a flat panel display, for displaying information to a computer user. An input device 214, including alphanumeric and other keys, is coupled to the bus 202 for communicating information and command selections to the processor 204. Another type of user input device is cursor control 216, such as a mouse, a trackball, or cursor direction keys for communicating direction information and command selections to processor 204 and for controlling cursor movement on the display 212. This input device typically has two degrees of freedom in two axes, a first axis (e.g., x) and a second axis (e.g., y) allowing the device to specify positions in a plane.

The processor 204 can execute sequences of instructions contained in the main memory 206. Such instructions can be read into main memory 206 from another computer-readable medium, such as storage device 210. However, the computer-readable medium is not limited to devices such as storage device 210. For example, the computer-readable medium can include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in the main memory 206 causes the processor 204 to perform the process steps described below. In alternative embodiments, hard-wired circuitry can be used in place of or in combination with software instructions to implement the invention. Thus, embodiments of the invention are not limited to any specific combination of hardware circuitry and software.

Computer system 112 also includes a communication interface 218 coupled to the bus 202. Communication interface 218 provides a two-way data communication as is known. For example, communication interface 218 can be an integrated services digital network (ISDN) card or a modem to provide a data communication connection to a corresponding type of telephone line. As another example, communication interface 218 can be a local area network (LAN) card to provide a data communication connection to a compatible LAN. In the preferred embodiment the communication interface 218 is coupled to the network cable 102. Wireless links can also be implemented. In any such implementation, communication interface 218 sends and receives electrical, electromagnetic or optical signals which carry digital data streams representing various types of information. Of particular note, the communications through interface 218 may permit transmission or receipt.

Figure 3:
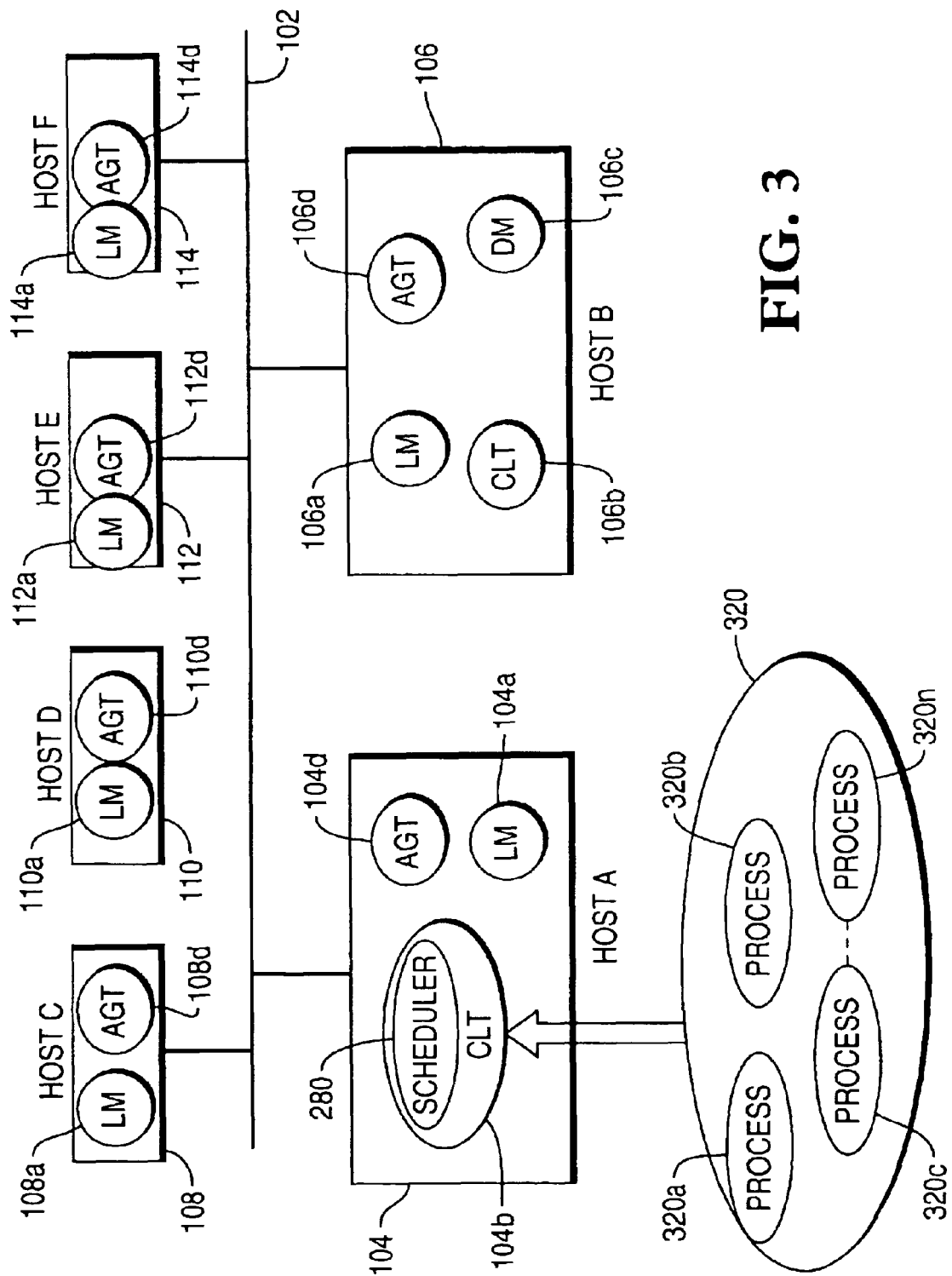
FIG. 3 is a logical view depicting a scheduler, resource managers, clients, agents, and processes on the computer network.

As depicted in FIG. 3 which provides greater detail than FIG. 1, a plurality of processes or groups of processes are represented by reference numeral 320 which includes processes 320a, 320b, 320c . . . 320n. As used herein reference numbers 320a, 320b, 320c . . . 320n refer to either a process or a group of processes. These processes can be a third party application or program or a network process. A plurality of host computers Host A (104), Host B (106), Host C (108), Host D (110), Host E (112), and Host F (114) are connected to network 100 as previously described. Computer system 102 includes a process allocating device such as a scheduler 280 residing in the processor 204. Scheduler 280 allocates the plurality of processes 320a, 320b, 320c . . . 320n to be executed on the plurality of computer systems 104, 106, 108, 110, 112, 114. Each computer 104–114 includes a local resource manager (LMs) 104a, 106a, 108a, 110a, 112a, 114a residing in the processor 204 of each of the respective computers to monitor the operational states thereof. Clients (CLT) are depicted at 104b and 106b and associated with Hosts A and B, respectively, although there can be additional clients on any of the Hosts C-F in the network 100. Scheduler 280 resides within client 104b. Clients 104b and 106b each can request computers usable for process distribution. Host B (106) includes a server or main domain resource manager (DM) 106c residing in the processor 204 which holds the data on the operational state of each computer 104–114 in the main memory 206 of Host B and determines the usable computers when a client CLT requests computer resources. Each computer system has a resource use permitting mechanism (referred to as agent or AGT) 104d, 106d, 108d, 110d, 112d, 114d residing in a respective processor 204 for supplying a message to the domain resource manager DM (106c) which permits the exclusive use of a computer resource to the client CLT by the domain resource manager DM.

The local resource managers (LMs 104a–114a) of the respective computers transmit situation data which indicate the processor 204 usage or the like of a respective computer to the domain resource manager (DM 106c). The local resource managers (LMs 104a–114a) of the respective computer systems also transmit hardware information for the respective computer systems to domain resource manager (DM 106c). Additional information such as reliability information can also be transmitted. As described herein, computer resources refer primarily to processor 204 resources and memory 206 resources for ease of discussion. As can be readily appreciated the present invention can also be used to allocate other network resources such as storage devices 210, printer resources and the like.

The resource allocation can be specified in any number of ways according to the present invention. For example, a process can be allotted a percentage of a processor on a network computer, a processor on a specific computer system, or an amount of memory space, or a percentage of memory space on network computers. The types of resource allocations can readily be expanded upon by one of skill in this art.

Figure 4:
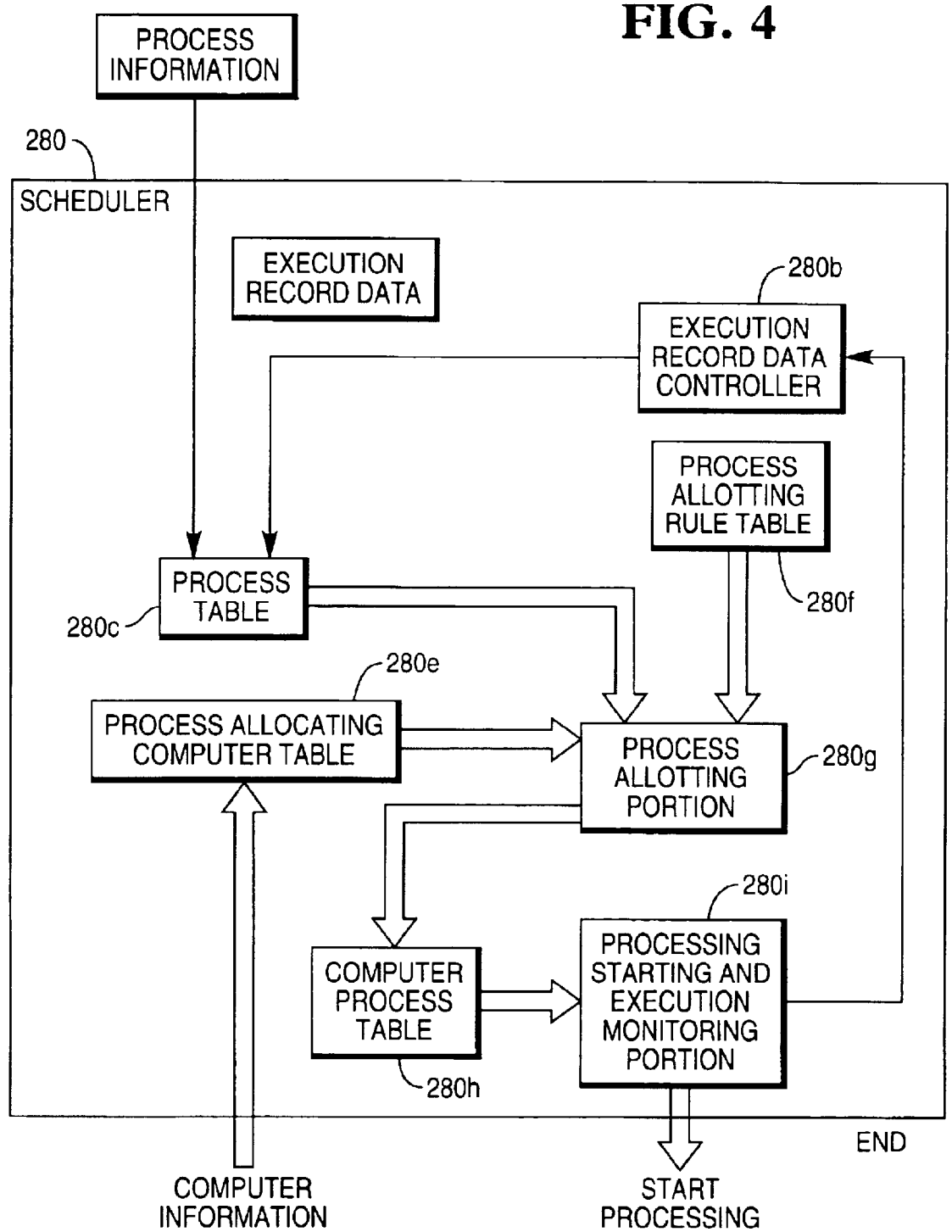
FIG. 4 is a logical view depicting the software modules within the scheduler.

In FIG. 3, the processes to be executed are represented by 320a–320n and information concerning each of the processes are routed through the scheduler 280. One embodiment of a logical structure of the scheduler 280 is depicted in FIG. 4. As previously mentioned, the scheduler 280 is used for the distribution of processes on the network 100. As depicted in FIG. 4, in the scheduler 280, an execution record data controller 280b maintains execution record data in a process table 280c for each of the processes 320a–320n to be executed and being executed by each of the computers on the network 100. As depicted in FIG. 4, process information on the amount of processing required by each of the 320a–320n processes is forwarded to process table 280c and is stored therein. This process information can be supplied by one of the clients CLT 104b, 106b. Data parameters such as the processor speed and the processor load (usage) are stored in a process allocating computer table 280e which is used for allocating the processes 320a–320n. The procedure for allocating the processes to the computer in the network 100 is stored in a process allocating rule table 280f. A process allocating portion 280g allocates the processes to computers 104–114 on the basis of the data supplied from process allocating rule table 280f. The correspondence of the computers to the processes which is created by the process allocating portion 280g is stored in a computer process table 280h. A process starting and execution monitoring portion 280i allocates the processes to the computers in accordance with the contents of the computer process table 280h and monitors the end of the executions of the processes.

The processing starting and execution monitoring portion 280i monitors the amount of processing resources being used for each process running on a computer on the network based on information provided by the local resource managers LMs 104a–114a to the domain resource manager DM 106c. The processing starting and execution monitoring portion 280i supplies data on the amount of processing resources being used by each process to the execution record data controller 280b during and after the end of processing to be stored in the process table 280c.

Figure 5:
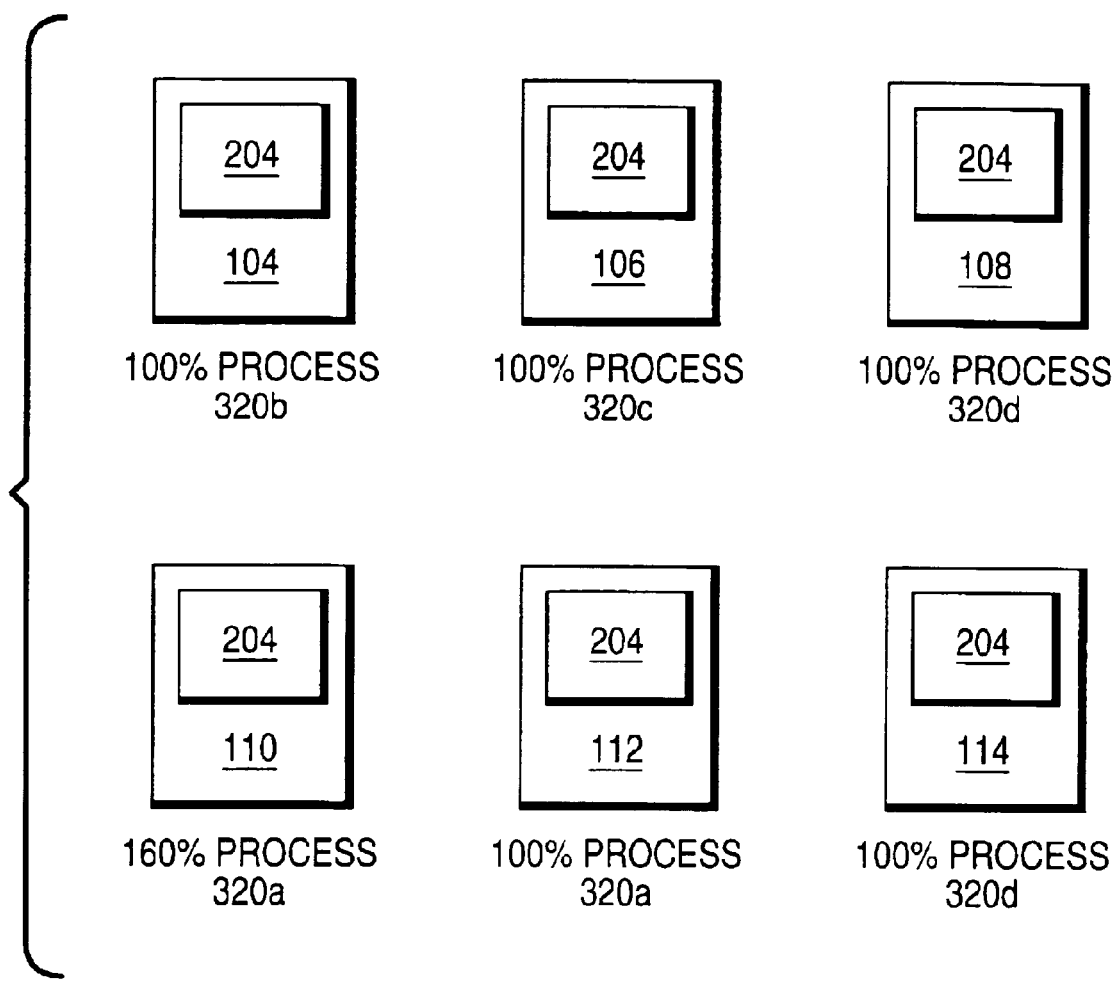
FIG. 5 is a schematic representation of a working example according to the present invention.

The use of the scheduler can best be explained using a working example. As depicted in FIG. 5 which depicts the computer systems of FIG. 1, for example, a systems administrator could specify that process group 320a should be allocated at least sixty percent of one processor 204 on computer system 110 and one hundred percent of processor 204 on computer system 112. To simplify this example, each of the computer systems 104–114 can be assumed to be identical. Further, a systems administrator could specify that process group 320b be allocated all of the resources on computer system 104 and that process group 320c be allocated all of the resources of computer system 106 and process group 320d be allocated all of the resources of computer systems 108 and 114. It is desirable that process group 320a be allocated more resources, if available. Importantly, and according to the present invention, the systems administrator also provides a priority to each of the processes 320a–320d. In this example, 320a has first priority, 320b has second priority and so forth. By examining the workload of the network as explained in detail below, resources can be reallocated, when necessary.

Referring back to FIGS. 4 and 5, process information on the amount of processing required by each process 320a–d is forwarded by the systems administrator to process table 280c and stored therein. In this example, the processing speed of the processors is irrelevant and thus no information is stored in table 280e. The priorities for processing 320a–320d allocation of resources and assignment of, as described above are stored in the process allocating rule table 280f. The process allocating portion 280g allocates the processes 320a–320d to computers 104–114 as described above and stores the correspondence of the computers 104–114 to the processes 320a–320d in the computer process table 280h. The process starting and execution monitoring portion 280i allocates the processes 320a–320d to the computers 104–114 in accordance with the contents of the computer process table 280h. The monitoring portion 280i supplies data on the amount of processing resources actually being used by processes 320a–320d to execution record data controller 280b.

Thus far in the working example, as depicted in FIG. 5, the amount of computer resources on the network exceeds the processing requirements of processes 320a–320d. At this point, in the working example, computer system 110 fails but otherwise the network remains functional. Because of this failure, there is no longer sufficient network processing resources to meet the needs of processes 320a–320d. Because process group 320a has the highest priority as stored in table 280f, the domain resource manager 106c (FIG. 3) working in conjunction with the scheduler 280 (FIG. 3) can reallocate network resources. In this simple example, the process 320a running on computer system 110 would be moved to either computer system 108 or 114 because process 320d has the lowest priority. After process 320a is moved to either computer system 108 or 114, process 320d will have no more than forty percent of the processor resources on computer system 108 or 114 where process 320a is moved.

The present invention can also be used for specifying an upper limit resource allocation that a particular process can use. Similarly, the present invention can also be used for specifying the upper limit and lower limit for resource allocations.

From the foregoing discussion it should now be apparent a method for allocating a minimum resource allocation to a process has been described. The resource allocation can be specified in any number of ways according to the present invention. For example, a process can be allotted a percentage of a processor on a network computer, a processor on a specific computer system, or an amount of memory space, or a percentage of memory space on network computers. The types of resource allocations can readily be expanded upon by one of skill in this art.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A method of allocating network resources on a computer network, comprising:
    monitoring at least two nodes on the computer network among at least a first process and a second process for allocation of computer resources on each of the at least two nodes;
    assigning a priority to each of the at least two processes, the second process being assigned a lower priority than the first process;
    for the first process running on at least one of the two nodes, setting a minimum resource allocation for the first process on the at least two nodes independent of the computer resources needed by other processes running on the computer network; and
    redistributing computer resources on the network so that the minimum resource allocation for the first process is guaranteed should insufficient network resources be available, said redistributing step being performed by removing a computer resource previously assigned to the second process, and reallocating the removed computer resource to the first process irrespective of an amount of computer resources necessary for the second process to run on the computer network.

2. The method of claim 1, wherein the minimum resource allocation is an allocation of computers and memory space on the network for the first process.

3. The method of claim 1, wherein the minimum resource allocation is an allocation of a minimum percentage of resources at the at least two nodes for the first process and for the second process.

4. The method of claim 1, wherein said monitoring step is performed periodically.

5. The method of claim 1, wherein said monitoring step is performed continually and the minimum resource allocation is an allocation of a minimum percentage of resources at the at least two nodes for the first process and for the second process.

6. The method of claim 1, comprising the further step of setting a maximum resource allocation for at least one of the first process and the second process.

7. The method of claim 1, comprising the further step of storing the minimum resource allocation in a storage device.

8. The method of claim 1, wherein said monitoring step can be performed by any of the at least two nodes on the computer network.

9. The method of claim 1, wherein said assigning step is performed irrespective of amounts of computer resources necessary for each of the at least two processes to run on the computer network.

10. An article, comprising:
    at least one sequence of machine executable instructions in machine readable form, wherein execution of the instructions by one or more processors causes the one or more processors to:

9

(i) monitor at least two nodes on the computer network among at least two processes for allocation of computer resources on each of the at least two nodes;

(ii) assign a priority to each of the at least two processes, the second process being, assigned a lower priority than the first process;

(iii) for a first process of the at least two processes running on at least one of the two nodes, set a minimum resource allocation for the first process on the at least two node irrespective of the computer resources needed by other processes running on the compute network; and (iv) redistribute computer resources on the network so that the minimum resource allocation for the first process is guaranteed should insufficient network resources be available, said redistribution being performed by removing a computer resource previously assigned to the second process, and reallocating the removed computer resource to the first process irrespective of an amount of computer resources necessary for the second process to run on the computer network.

11. A computer architecture for switching resource allocation policies on a compute network, comprising:

monitoring means for monitoring at least two nodes on the computer network among least a first and a second process for allocation of computer resources on each of the at least two nodes;

assigning means for assigning a priority to each of the at least two processes, the second process being assigned a lower priority than the first process:

for the first process running on at least one of the two nodes, setting means for setting a minimum resource allocation for the first process on the at least two nodes independent of the computer resources needed by other processes running on the computer network; and redistributing means for redistributing computer resources on the network so that the minimum resource allocation for the first process is guaranteed should insufficient network resources be available, said redistribution being performed by removing a computer resource previously assigned to the second process, and reallocating the removed computer resource to the first process irrespective of an amount of computer resources necessary for the second process to run on the computer network.

12. A computer system comprising:

a processor; and a memory coupled to said processor, the memory having stored therein sequences of instructions, which, when executed by said processor, cause said processor to perform the steps of:

monitoring at least two nodes on the computer network among at least a first process and a second process for allocation of computer resources on each of the at least two nodes;

assigning a priority to each of the at least two processes, the second process being assigned a lower priority than the first process;

for the first process running on at least one of the two nodes, setting a minimum resource allocation for the first process on the at least two nodes independent of the computer resources needed by other processes running on the computer network; and redistributing computer resources on the network so that the minimum resource allocation for the first process is guaranteed should insufficient network resources be available, said redistributing step being performed by removing a computer resource previously assigned to the second process, and reallocating the removed computer resource to the first process irrespective of an amount of computer resources necessary for the second process to run on the computer network.

13. A method of allocating network resources on a computer network, comprising the steps of:

allocating computer resources on each node of the computer network among at least a high-priority process and a low-priority process according to an allocation schema associated with said node;

setting a minimum resource allocation for the high-priority process independent of computer resources needed by other processes running on the computer network;

monitoring first nodes on which the high-priority process is executed; and if computer resources allocated to the high-priority process on at least one of said first nodes become unavailable, changing the allocation schema associated with at least one of second nodes on which the low-priority process is executed to remove an amount of computer resources previously assigned to the low-priority process and reallocate the removed amount of computer resources to the high-priority process, whereby the minimum resource allocation for the high-priority process is guaranteed regardless of computer resources necessary for the low-priority process to run on said at least one of said second nodes.

* * * * *